United States Patent

Smart

[15] 3,646,966
[45] Mar. 7, 1972

[54] CONTROL MEMBER FOR PROPORTIONING VALVES

[72] Inventor: Edwin Allen Smart, Milwaukee, Wis.
[73] Assignee: Bradley Washfountain Co., Menomonee Falls, Wis.
[22] Filed: Apr. 3, 1970
[21] Appl. No.: 25,515

[52] U.S. Cl. ........................................................137/625.4
[51] Int. Cl. ..................................................F16k 11/00
[58] Field of Search ..............................137/625.4, 625.17

[56] References Cited

UNITED STATES PATENTS

| | | | |
|---|---|---|---|
| 3,297,051 | 1/1967 | Church et al. | 137/625.17 |
| 3,378,034 | 4/1968 | Andrews | 137/625.4 |
| 3,490,492 | 1/1970 | Fairchild | 137/625.4 |
| 3,519,018 | 7/1970 | Cole et al. | 137/625.4 |

Primary Examiner—Samuel Scott
Attorney—Arthur H. Seidel and Allan W. Leiser

[57] ABSTRACT

There is shown a proportioning valve for controlling the mixing of two fluids. A valve body with an internal recess has a pair of diametrically opposed inlet ports and an outlet that connects with a discharge spout. A sleeve is inserted in the recess which has deflectable sealing cushions directly in front of the inlet ports, and an elongate control rod is inserted within the sleeve which is movable both in axially and circumferential directions. The control rod has a cylindrical portion which squeezes the sealing cushions of the sleeve into port closing positions, and a tapered portion canted at an angle which when moved into alignment with the inlet ports controls the relative amounts of flow from the two ports in response to rotation of the control rod. The tapered portion has a lobe extending along a substantial length of the rod to present a radial protrusion, such that when the control rod is adjusted to have flow from one inlet port and no flow from the other the closing pressure against the sealing cushion of the closed port is augmented.

4 Claims, 7 Drawing Figures

PATENTED MAR 7 1972

INVENTOR
E. ALLEN SMART

BY

Arthur N. Siedel

ATTORNEY

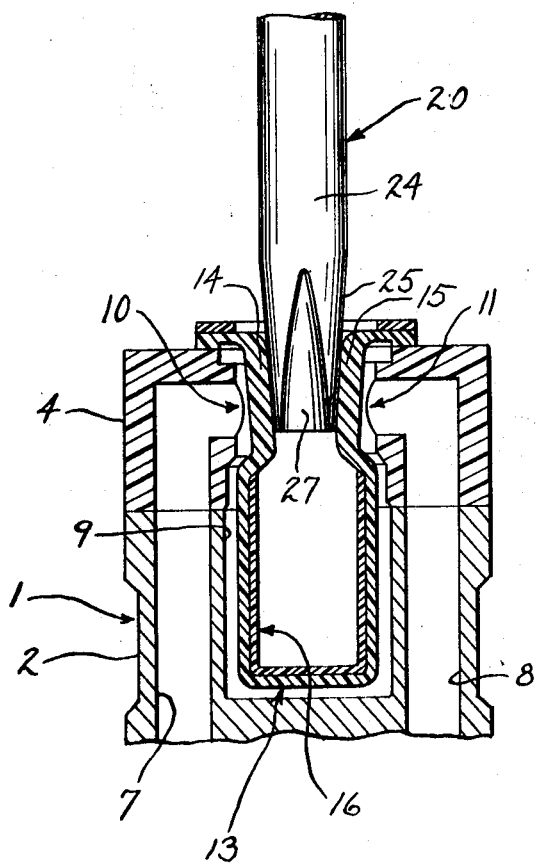
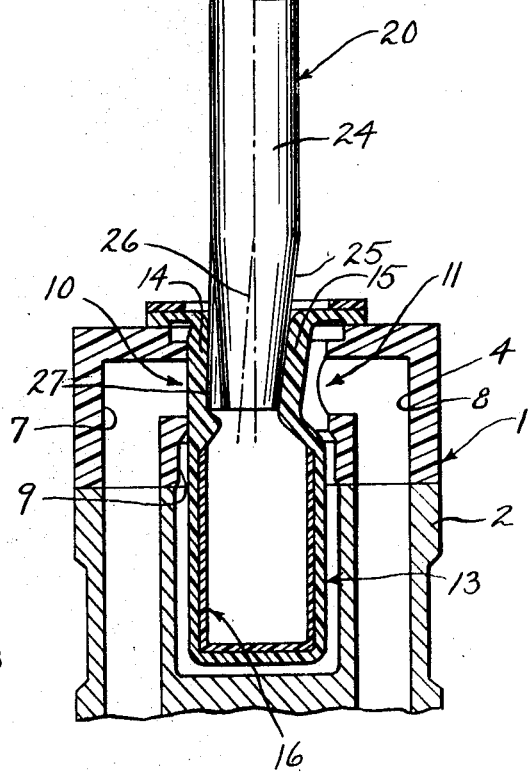
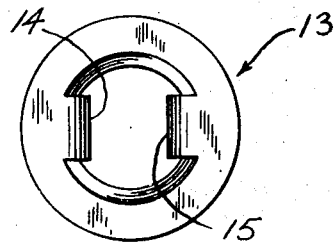
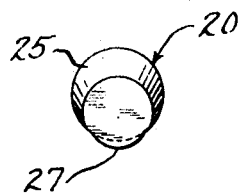

CONTROL MEMBER FOR PROPORTIONING VALVES

BACKGROUND OF THE INVENTION

The present invention relates to improvements in fluid proportioning valves as shown and described in the copending application of George S. Cole and Richard L. Ritzenthaler entitled "Proportioning Valve," filed Aug. 16, 1968 and having Ser. No. 755,498, now U.S. Pat. No. 3,519,018. In valves of the construction shown in such application a valve body is provided with an internal recess having a pair of diametrically opposed inlet ports. A sleeve is inserted in the recess which has a flexible sealing cushion immediately to the front of each inlet port to function as an opening and closing valve. To control the valving movement of these flexible cushions a control rod is inserted in the sleeve. Such control rod has a tapered portion which can be brought into alignment with the inlet ports, and by rotation relative amounts of fluid entering from the two ports may be controlled. In one position of rotation the tapered portion seals the sleeve against one inlet port and allows the sleeve to move freely from the other inlet port, so as to admit of one fluid only. It is desired in such instances of control to have minimal flow of fluid from the closed inlet port, but the desired sealing of one inlet port may not occur for all valves manufactured under usual production techniques. This is for the reason manufacturing tolerances in some valves may all add in one direction, so that seals are not as tight as desired. Also, some unusual applications under high fluid pressure may experience some leakage through the closed port. To alleviate these problems the present invention has been proposed.

SUMMARY OF THE INVENTION

The present invention relates to fluid proportioning valves, and it more specifically resides in a control member having a cylindrical portion that may be brought into alignment with the inlet ports of a valve to tightly seal off the ports, and a canted tapered portion extending axially with respect to the cylindrical portion that can be aligned with the inlet ports to control relative amounts of fluid flow from the ports, and in which a lobe extends radially from the tapered portion along the side thereof that is employed to seal off an inlet port.

Control members for fluid proportioning valves of the type to which this invention pertains are commonly in the form of elongated rods that are both axially and circumferentially movable. These rods bear against flexible sealing cushions that overlie inlet ports, and radial pressure is relied upon for tightly sealing these flexible cushions against the inlet ports in order to close off fluid flow. It is difficult to maintain adequate radial pressure under all conditions of operation. To maintain radial pressures the bearings in which a control rod slides must be precise and conform very closely with the diameters of the control rod at the bearing points. The bearing points, however, are located to one end only of the control rods, such end being opposite that at which closing pressure must be exerted against cushions at the inlet ports. Under conditions of mass manufacture, in which manufacturing tolerances must be permitted, some degree of looseness of bearing fit may occur at times which detract from the maintenance of desired closing pressures.

The present invention overcomes the difficulties in the practice of manufacturing proportioning valves of the type described in said pending application, and it is a particular object of this invention to improve the sealing characteristics of such valves.

It is a further object of the invention to provide valves with control rods of elongate nature in which one of a pair of inlet ports may be tightly sealed off while the other inlet port is fully open to obtain maximum relative flow of one fluid only. It is a still further object of the invention to allow for proportioning valves with greater degrees of tolerances of the individual parts, so as to simplify the manufacture thereof.

The foregoing and other objects and advantages of this invention will appear from the following description, in which description, and the accompanying drawings, there is shown and described by way of illustration and not of limitation a preferred embodiment of the present invention. Reference is made to the claims at the end of this description for a determination of the scope of the invention.

BRIEF DESCRIPTION OF THE DRAWINGS

FIG. 3 is a top view of the sleeve shown in FIG. 2, FIG. 5 is a fragmentary view in cross section of the valve of FIG. 1 taken through the plane 5—5, in which a control rod of the valve is in a raised position, FIG. 6 is a fragmentary view in cross section also taken on the plane 5—5, but in which the control rod has been rotated 90° to seal off one inlet port of the valve, and FIG. 7 is an end view of the control rod of the valve.

DESCRIPTION OF THE PREFERRED EMBODIMENT

Figure 1:
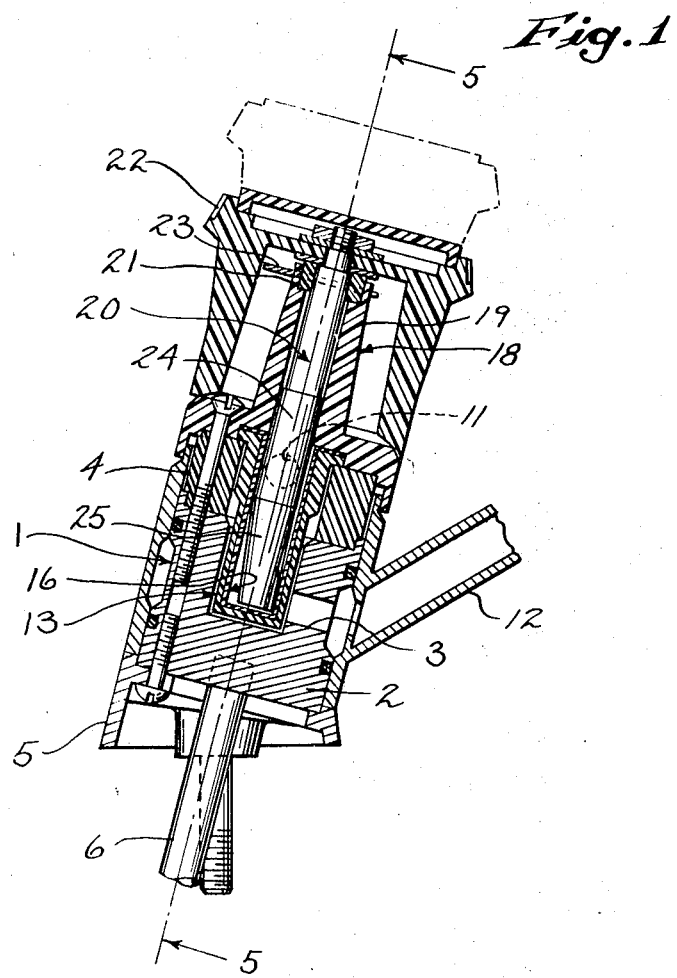
FIG. 1 is a side view in cross section of a fluid proportioning valve embodying the invention.

Referring now to the drawings, there is shown in FIG. 1 a fluid proportioning valve having a general construction like that of the valve shown in said pending application, Ser. No. 755,498. Thus, if a more detailed description of the various parts of the valve is desired, reference should be made to such pending application. The valve has a body 1 comprised of two principal components, namely a lower section 2 which has an outlet opening 3, and an upper section 4 seated directly atop the lower section 2. The lower section 2 is seated on an escutcheon 5, and fluid inlet pipes 6 enter into the bottom of the lower section 2. As shown in FIGS. 5 and 6, inlet ducts 7 and 8 continue through the lower section 2 upward into the upper section 4, and then turn radially inward to open upon an internal recess 9. The ducts 7 and 8 thus form a pair of diametrically opposite inlet ports 10 and 11 at the points where they enter upon the recess 9, and it is a purpose of the construction of the present invention to provide a means for controlling the opening and closing of these inlet ports 10 and 11.

The recess 9 extends completely through the upper section 4 of the valve body 1, and continues downwardly into the lower section 2 as a cavity closed at its bottom. The cavity constitutes a mixing chamber for dissimilar fluids, such as hot and cold water, entering through the ports 10 and 11. From the bottom of the recess 9 the outlet 3 communicates with a swing spout 12 which is rotatably mounted in surrounding relation to the valve body 1.

Figure 2:
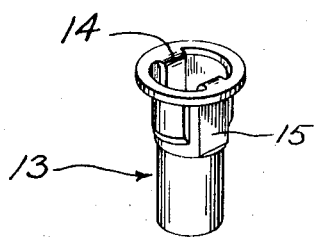
FIG. 2 is a view in perspective of a resilient sleeve that is employed in the valve of FIG. 1.
Figure 4:
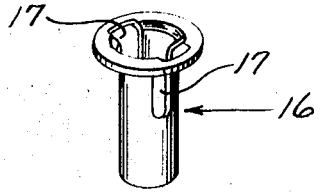
FIG. 4 is a view in perspective of a secondary sleeve that is inserted within the sleeve of FIG. 2.

A sleeve 13 composed of a suitable, flexible material, and having a configuration as shown in FIG. 2 is inserted within the recess 9. The sleeve 13 is closed at its bottom, and is flanged at its top so as to sit upon the upper surface of the valve body 1. The sleeve 13 is characterized by having a pair of inlet port sealing cushions 14 and 15 that are positioned directly to the front of the inlet ports 10 and 11, as shown in FIGS. 5 and 6. Inserted within the sleeve 13 is a secondary sleeve 16, which is thin walled and of the configuration shown in FIG. 4. The secondary sleeve 16 is preformable of a stiff, plastic material, and it has diametrically opposite openings 17 through which the sealing cushions 14 and 15 protrude. Hence, the secondary sleeve 16 acts as a stiffening member for the sleeve 13, except at the regions where the sealing cushions 14 and 15 are disposed to the front of the inlet ports 10 and 11. By this construction, the sealing cushions 14 and 15 are free to be moved toward and away from the inlet ports 10 and 11 so as to function as valves, but the remainder of the sleeve 13 is substantially nondeformable. Water pressure in the recess 9 will not collapse the sleeve 13 and work directly against the control rod to be hereinafter described.

Capping the upper end of the valve body 1 is a bearing member 18. It is bolted in place to hold the sleeves 13, 16 in position, and it has an elongate tubular portion 19 concentric with and extending upward from the recess 9. Inserted within the bearing member 18 and the sleeves 13, 16 is a long, relatively thin control rod 20 that is bearingly supported at the top end of the tubular portion 19 by a bearing insert 21, and at the lower end of the tubular portion 19 by a snug fit therewith. Fastened to the top of the control rod 20 is a handle 22 which may be pulled upwardly, returned downwardly, or rotated for the purpose of controlling fluid flow. The bearing insert 21 is held in place within the upper end of the tubular portion 19 by a bifurcated assembly ring 23 that engages both the tubular portion 19 and the bearing insert 21.

The control rod 20 has a circular cylindrical portion 24 offset slightly below its longitudinal center that is axially in alignment with the inlet ports 10 and 11 when the handle is in its lower position of FIG. 1. In this position, the cylindrical portion 24 tightly sandwiches both the sealing cushions 14, 15 against the ports 10, 11 to close off fluid flow through the valve.

The control rod 20 also has a tapered portion 25 that is a downward, axial continuation of the cylindrical portion 24, and as particularly shown in FIGS. 5 and 6 the tapered portion 25 may be raised by an upward axial movement of the rod 20 to be brought into facing relation with the inlet ports 10 and 11. This tapered portion 25 may be described as somewhat conical in form with an axis 26 (see FIG. 6) that is canted with respect to the longitudinal axis 27 of the rod 20. The tapered aspect of the portion 25 provides a volume control, so that as the rod 20 is raised and the portion 25 moves upwardly past the ports 10, 11 the sealing cushions 14 and 15 may deflect further and further from the ports 10 and 11 to admit an increasing flow of fluid into the recess 9. This is illustrated in FIG. 5.

The canted aspect of the tapered portion 25 provides a control of the relative proportion of the two fluids that are admitted through the inlet ports 10 and 11 that is obtained by a rotation of the handle 22 and rod 20. Thus, when the rod 20 is in a position such that the canting of the axis 26 is not directed toward either port 10 or 11, as in FIG. 5, a raising and lowering movement will at all times admit equal amounts of each fluid. But, if the rod 20 is rotated to direct the canted axis 26 toward one of the ports 10 or 11, as toward port 10 in FIG. 6, then the port towards which the axis 26 is directed will be closed a greater amount than the opposite port, whereby a proportioning control is obtained over the fluids entering recess 9.

When it is desired to admit fluid through one port, 10 or 11, only, then a tight shutoff of the other port must be effected, and the tapered portion 25 of the control rod 20 is given a unique configuration to achieve this objective. As shown in FIGS. 1 and 6, one side of the tapered portion 25 is substantially a straight axial continuation of the surface of the cylindrical portion 24, whereas the opposite side has the maximum taper. Thus, the closing function of the cylindrical portion 24 is continued axially along one side of the entire length of the rod 20. This continuing side of the tapered portion 25 is, however, given a more complex configuration, than a mere straight continuation of the circular portion 24, by provision of a lobe 27 that is most clearly seen in FIGS. 6 and 7. The lobe 27 gradually inclines radially outward as one moves down the length of the rod 20, to reach its maximum radial protrusion at the lower end of the rod. This protrusion is radially beyond the radius of the cylindrical portion 24, and as seen in FIG. 7, the lobe 27 is rounded when viewed from the lower end of the rod 20 to have a circumferential extent of approximately 60° at the lower rod end. As seen in FIG. 5, the lobe 27 is of increasing circumferential extent as one progresses downwardly along the rod 20, so that its presence is more pronounced as one approaches the lower rod end.

The bearing insert 21 and the interior bearing wall of the tubular portion 19 will have some clearance, albeit small, with the rod 20 to allow rod movement to take place without binding. This clearance may vary due to manufacturing tolerance, and thus as the rod 20 is raised the lower tapered end portion 25 may have some lateral sway. The side of the tapered portion that tightly presses a sealing cushion 14, 15 against the respective inlet port 10, 11 may not produce as an effective squeeze against the cushion 14, 15 as desired. The provision of the lobe 27, however, develops a greater closing force as the rod 20 is raised, and through its presence tight shutoff can be attained at one port 10, 11 when the other is fully "on."

What is claimed is:

1. In a fluid proportioning valve having a valve body with inlet ports and an outlet, inlet port sealing means having flexible material and overlying said inlet ports for movement toward and away from such ports to seal the same when pressed thereagainst, a control member telescoped with the valve body to sandwich said sealing means between said body and said control member and that is both axially movable and rotatable for controlling the opening of said inlet ports, the combination therewith of:

a cylindrical portion for said control member that when aligned with said inlet ports presses said sealing means against said inlet ports to close the same;

a tapered portion for said control member axially spaced from the cylindrical portion which is canted with respect to said cylindrical portion, and which when aligned with said inlet ports permits said inlet port sealing means to move away from such ports; and a lobe along one side of said tapered portion that protrudes radially outward of said cylindrical portion to enhance the port closing action of the control member.

2. In a fluid proportioning valve having a valve body with inlet ports and an outlet, inlet port sealing means having flexible material and overlying said inlet ports for movement toward and away from such ports to seal the same when pressed thereagainst, and a control member telescoped with the valve body to sandwich said sealing means between said body and said control member, such control member being both axially movable and rotatable for controlling the pressing of said sealing means against said inlet ports, the combination therewith of:

a cylindrical portion for said control member that when aligned with said inlet ports presses said sealing means against said inlet ports;

a tapered portion for said control member that is an axial extension of the cylindrical portion which is canted with respect to said cylindrical portion to have one side thereof form an axial extension of a side of said cylindrical portion and the other sides being tapered to control volume of flow in the valve; and an axially tapered lobe along said side of said tapered portion, that protrudes radially beyond said one side with its maximum protrusion toward the end of the tapered portion that is remote from said cylindrical portion.

3. In a fluid proportioning valve having a valve body with inlet ports and an outlet, inlet port sealing means having flexible material and overlying said inlet ports for movement toward and away from such ports to seal the same when pressed thereagainst, and a control member telescoped with the valve body to sandwich said sealing means between said body and said control member, such control member being both axially movable and rotatable for controlling the pressing of said sealing means against said inlet ports, the combination therewith of:

a cylindrical portion for said control member that when aligned with said inlet ports presses said sealing means against both said inlet ports;

a tapered portion for said control member axially spaced from the cylindrical portion which is canted with respect to said cylindrical portion to have one side thereof form an axial extension of a side of said cylindrical portion; and an axially tapered lobe extending along said side of said tapered portion that protrudes radially beyond the radius of said cylindrical portion with its maximum protrusion being located toward the end of the tapered portion that is remote from said cylindrical portion, and which lobe has a circumferential extent of at least 60° at the end of the tapered portion.

4. In a control member for a valve that is both axially movable and rotatable for controlling the volume and proportion of fluid flow from a pair of inlet ports, the combination comprising:

a cylindrical portion for said control member;

a tapered portion for said control member axially spaced from the cylindrical portion which is canted with respect to said cylindrical portion to have one side thereof form an axial extension of a side of said cylindrical portion; and an axially tapered lobe along said side of said tapered portion that protrudes radially beyond the other parts of the rod with its maximum protrusion toward the end of the tapered portion that is remote from said cylindrical portion.

* * * * *